3,509,227
PROCESS FOR THE CATALYTIC HYDROGENATION OF AROMATIC COMPOUNDS
Taisuke Asano and Junichi Kanetaka, Kawasaki-shi, Japan, assignors to Mitsubishi Petrochemical Co., Ltd., Tokyo, Japan
Filed Oct. 31, 1967, Ser. No. 679,349
Claims priority, application Japan, Nov. 15, 1966, 41/75,151
Int. Cl. C07c 5/10
U.S. Cl. 260—667                    3 Claims

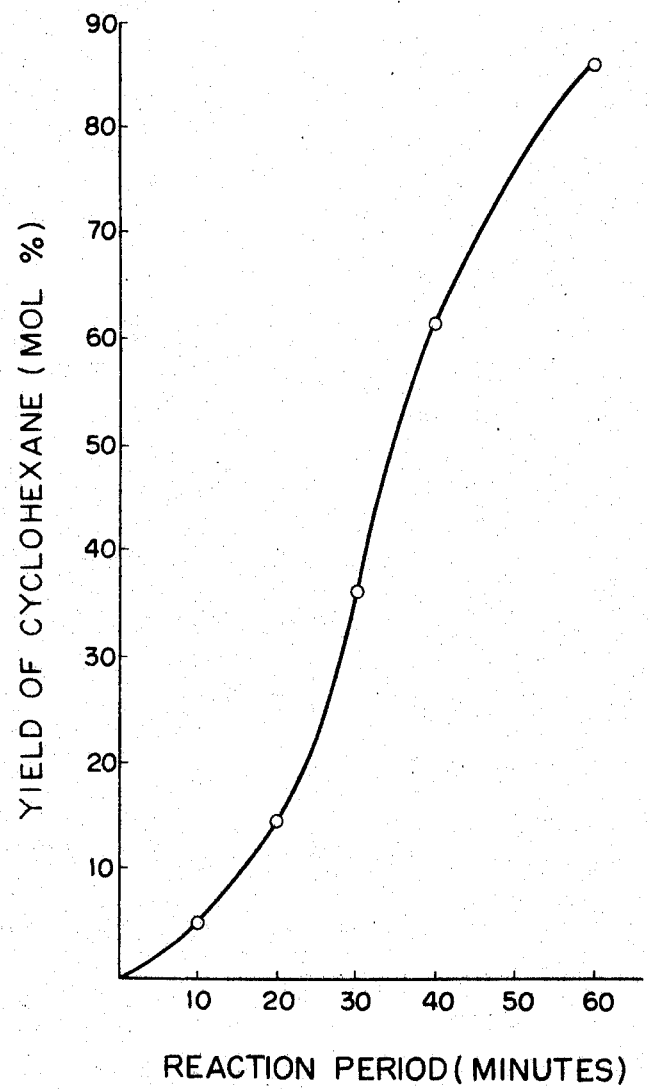

ABSTRACT OF THE DISCLOSURE

Process for hydrogenating carbon-carbon double bond containing organic compounds intermixed with a sulfur compound which comprises bringing said organic compounds into contact with hydrogen in the presence of a catalyst composition comprising nickel and rhenium.

BACKGROUND OF THE INVENTION

(1) Field of the invention

This invention relates to a process for hydrogenating carbon-carbon double bond containing organic compounds intermixed with a poisonous sulfur compound which is a catalyst poison to a nickel catalyst.

(2) Description of the prior art

It is well known that the catalytic hydrogenation of aliphatic or aromatic organic compounds containing carbon-carbon double bond, carbonyl group or other chemical group or bond which may be hydrogenated affords corresponding hydrogenated derivatives of these compounds. It is also generally known that sulfur compounds such as thiophene, diethyl sulfide, thiophenol, thionaphthene and the like intermixed with the starting material have a remarkable catalyst poisoning effect on the conventional hydrogenation catalysts. Thus, for example, in the production of cyclohexane by hydrogenating benzene in the presence of a nickel catalyst, it is necessary to reduce the concentration of the sulfur compounds contained in the starting benzene to a level as low as several p.p.m., and to remove the sulfur compounds as completely as possible from hydrogen used, before carrying out the hydrogenation reaction. In addition, even if the content of the sulfur compound is decreased to a minimal amount by the desulfurization, the catalyst activity is gradually decreased due to the fact that the poisoning effect of the sulfur compound is irreversible. Thus, the yield of hydrogenated product per unit weight of the catalyst used is in general dominated by the content of the sulfur compounds in the starting material.

There have been proposed heretofore the combination catalysts such as nickel-copper or nickel-copper-chromium as the catalyst compositions resistable to the poisoning by the sulfur compounds. It is presumed that the high activity portion of these catalyst compositions is protected against the action of sulfur by the behavior of the low activity portion of the catalyst which absorbs the sulfur compounds selectively. However, in this instance, when the adsorption of the sulfur compounds to the low activity portion of the catalyst has reached a saturated level, the adsorption of the sulfur compounds to the high activity portion necessarily takes place.

Moreover, the sulfur adsorbed to the low activity portion of the catalyst is a permanent poison to the catalyst which cannot be reversibly eliminated, and it tends to decrease the yield of hydrogenated product per unit weight of the catalyst as compared with that of a nickel catalyst adsorbing no sulfur compounds.

Thus, in conclusion, a satisfactory resistance to the poisoning by the sulfur compound is not attainable by the combination of nickel-copper or nickel-copper-chromium.

SUMMARY OF THE INVENTION

It is, therefore, an object of this invention to provide a process for an advantageous hydrogenation of organic compounds intermixed with poisonous sulfur compounds which are the catalyst poison to a nickel catalyst.

It has now been found that the object mentioned above can be accomplished by carrying out the hydrogenation reaction in the presence of a catalyst composition comprising nickel and rhenium.

In the catalyst composition mentioned above, the nickel component which may be combined with rhenium component include, for example, simple or pure nickel such as Raney-nickel; nickel supported on a carrier such as kieselguhr, alumina, pumice and the like; and nickel alloys consisting of a major portion of nickel such as nickel-chromium alloy, nickel-zinc alloy and the like.

The rhenium component which may be used in the process of this invention include elementary rhenium such as rhenium black which may be obtained by reducing rhenium compounds such as oxides, halides, oxyhalides, or sulfates in a suitable manner prior to or in the course of the reaction.

As rhenium compounds, rhenium oxides are particularly preferred from the standpoints of maintaining the activity of the co-working nickel catalyst and the resistance to the poisoning by the sulfur compound intermixed with the starting material as well as the counteraction against the poisoning. Although rhenium heptoxide is most commonly used, other lower oxides may also be used as well. When rhenium heptoxide is used, it is well presumed that all or a part of said heptoxide is reduced in the course of hydrogenation reaction to the lower oxides or even to elementary rhenium. Further, if it is used in the form of an aqueous solution as in the examples described hereinafter, rhenium may sometimes take hydrated form or other forms such as perrhenate in the reaction system.

While the nickel-rhenium catalyst composition can be prepared in various ways, it is preferable to prepare the same in the form supported on a carrier as described in the following:

The process for the preparation of the catalyst composition supported on a carrier comprises combining a nickel compound which may be decomposed to metallic nickel by heating in a reducing atmosphere with a rhenium compound which may be decomposed to metallic rhenium by heating in a reducing atmosphere intimately together on a carrier, and heating the resulting combined material in a reducing atmosphere until a solid solution of nickel and rhenium is formed by a thermal decomposition of said compounds.

Although the process mentioned above may be carried out in different ways, in order to accomplish the intimate combination of said compounds, a means involving an impregnation process is preferable. In other words, it is desirable that the compounds per se, or precursor and derivatives thereof which are to be combined together are introduced onto a carrier in the form of a solution, particularly an aqueous solution. In this case, the respective solutions of said nickel compound and rhenium compound, or a mixture of these, may be used to impregnate a carrier, or, these nickel and rhenium compounds may be precipitated on a carrier from solutions thereof by a precipitating agent. Alternatively, either one of these compounds may be first precipitated on a carrier which is then impregnated with the solution of other compound.

Among these methods as described above, the last method is particularly preferable. According to the above-mentioned process, a catalyst composition of this invenion is prepared by kneading an aqueous nickel salt solution and a carrier well, said nickel salt being preferably water soluble and thermally decomposable, for example, nickel nitrate and nickel formate, and said carrier being preferably a porous material including kieselguhr, which is particularly suitable, silica gel, alumina, silica-alumina and the like which may usually be used as a carrier for catalyst; adding to the resulting mixture an aqueous solution containing precipitating agent such as ammonium carbonate, sodium bicarbonate and the like which insolubilizes said water soluble nickel salt, and depositing the precipitate of nickel component on a carrier. The resulting mixture is further kneaded with an aqueous solution of rhenium compound which also has water soluble and thermally decomposable properties such as, preferably rhenium heptoxide, and dried at a temperature of about 100° C. to about 130° C. After being completely dried, the product is reduced in a hydrogen stream. However, if vaporizable rhenium heptoxide is used, it is desirable that the product may be subjected to a preliminary reduction treatment in a hydrogen stream at a temperature of about 200° to about 250° C. for about 2–3 hours so that the rhenium heptoxide may be converted to lower oxides. After such pretreatment as described above, the product containing nickel compound and rhenium compound is reduced in a hydrogen stream at a temperature of 350° to 500° C., and most preferably 400° to 450° C., for 2–4 hours to give a catalyst composition of this invention.

It is noted that at a lower temperature e.g. about 350° C., a prolonged reducing period e.g. 10–20 hours, is required. On the other hand, at a higher temperature e.g. about 500° C., the activity of the product catalyst tends to decrease due to the sintering of catalyst granules.

The catalyst composition of this invention may be formed into a desirable shape by adding a suitable binder at any stages in the course of preparation, if necessary.

The catalyst composition thus prepared is, like other reduced nickel catalyst, spontaneously combustible upon contacting with air, however, the ordinary means for stabilizing the conventional nickel catalyst as by treatments with carbon dioxide-diluted air or an inert gas, may also be applicable to the catalyst composition of this invention as well.

It has been confirmed by the X-rays diffraction that nickel and rhenium in the nickel-rhenium catalyst prepared as above are in the form of solid solution.

Alternatively, these rhenium components may also be charged to the reaction system separately from nickel catalyst. For example, the rhenium compound may be charged to the reactor as it is, or in the form of a solution or a dispersion, separately from nickel catalyst, and by so doing the preliminary preparation of nickel-rhenium catalyst composition may be eliminated or the treatment of rhenium compound to obtain rhenium black become unnecessary as well.

With regard to the rhenium content in the catalyst composition of this invention, no particular restriction is necessarily imposed thereon. In general, when the content of rhenium is icreased in the catalyst composition, the resistance or counteraction of the catalyst to the poisoning by the sulfur compounds is increased. However, since rhenium is expensive as compared with nickel, the less content of rhenium is desirable from the standpoint of economy.

Although the practical content of rhenium should be decided by consulting with the content of the poisonous sulfur compounds intermixed with the starting material, the degree of poisoning power of the sulfur compound and the type of catalyst used, the catalyst compositions having an atomic ratio of rhenium to nickel of less than 0.1, most preferably less than 0.05 is generally used.

The nickel-rhenium catalyst composition which may be used in the process of this invention inherently has a higher activity than that of the conventional reduced nickel catalyst as shown in Table 1 given in the Comparative Example described hereinafter, and maintains the catalyst activity even in a region having a higher concentration of the poisonous sulfur compounds as compared with the conventional reduced nickel catalyst.

The accompanying drawing is a diagram showing a course of a reaction in an embodiment of the catalytic hydrogenation according to the process of this invention.

As can be noted from Table 3 given in Example 2 described hereinafter and the accompanying drawing, in the hydrogenation of benzene intermixed with thiophene which is a poisoous sulfur compound, there is observed a change in the rate of reaction as a lapse of time. That is, the rate of reaction is slow at an initial stage of the reaction, then, the rate is gradually accelerated in the intermediate stage and the rate is slowed down again at the terminal stage of the reaction. It is to be understood that this phenomenon indicates that the activity of the catalyst is increased as the lapse of time during the reaction and that the rate of reaction slows down as the reaction has been proceeded sufficiently and the concentration of benzene is correspondingly decreased.

Although the mechanism of this phenomenon has not been understood fully, it is reasonably presumed that the catalyst poisoned by the poisonous sulfur compounds resumes its catalyst activity as the lapse of time.

The process for the catalytic hydrogenation of this invention per se is substantially the same as the conventional catalytic hydrogenation processes known heretofore except that the reaction is carried out in the presence of the nickel-rhenium catalyst. Thus, the process of this invention may be practised according to the conventional catalytic hydrogenation processes using nickel catalysts.

Generally speaking, the catalyst composition which may be used in the process of this invention is effective for the hydrogenation of organic compounds containing carbon-carbon double bond.

In accordance with the process of this invention, a partial or complete hydrogenation of organic compounds such as, for example, benzene, toluene, o-, m- or p-xylene, durene, cumene, t-butylbenzene, n-hexadecylbenzene, p-cymene, naphthalene, α- or β-methynaphthalene, anthracene, phenathrene, diphenyl, diphenylmethane and acenaphthene, can be accomplished.

However, when a large amount of poisonous sulfur compounds enough to poison the whole active centers of the catalyst are present in the starting material, no catalytic ability is expected from the catalyst even in the process of this invention. It is, therefore, desirable to carry out the hydrogenation reaction after reducing the content of poisonous sulfur compounds in the starting material to a lower level by a suitable pretreatment, when the content is extraordinarily high.

DESCRIPTION OF THE PREFERRED EMBODIMENTS

This invention will be explained more fully in the following examples. It should not be construed, however, that these examples restrict this invention as they are given merely by way of illustration:

COMPARATIVE EXAMPLE

The catalytic hydrogenation of 50 g. of benzene was carried out in a 100 ml. capacity autoclave provided with an electromagnetic stirrer under the reaction conditions including the various reaction temperatures as specified in the following Table 1, a reaction pressure of 100 kg./cm.$^2$ and a reaction period of one hour in the presence of 0.25 g. of a catalyst composition comprising nickel, rhenium and kieselguhr having an atomic ratio of rhenium to nickel of 0.03, prepared according to the procedures described hereinbefore.

For comparison, the above experiment was repeated under exactly the same conditions as described above except that a catalyst composition comprising nickel and kieselguhr, containing no rhenium, was substituted for the nickel-rhenium-kieselguhr catalyst composition. The results are shown in the following Table 1.

In the instant Comparative Example as well as in the following examples, hydrogen was charged to the reactor with a pressure of 15 kg./cm.$^2$ (normal temperature) until the reaction temperature was reached.

As noted from the Table 1, it was confirmed that these catalysts showed a sufficient stationary activity at the starting of the reaction in the absence of poisonous sulfur compound.

TABLE 1

| Reaction temperature (° C.) | Yield of cyclohexane (mol percent) | | |
|---|---|---|---|
| | 180 | 200 | 220 |
| Catalyst used: | | | |
| Nickel-rhenium-kieselguhr | 90.06 | 99.73 | 99.95 |
| Nickel-kieselguhr | 54.20 | 83.27 | 99.75 |

EXAMPLE 1

The catalytic hydrogenation of 50 g. of benzene containing thiophene at various concentrations as specified in the following Table 2 was carried out under the reaction conditions including a reaction temperature of 200° C., a reaction pressure of 100 kg./cm.$^2$ and a reaction period of one hour in the presence of nickel-rhenium-kieselguhr or nickel-kieselguhr catalysts as used in the Comparative Example. The results are shown in the following Table 2:

TABLE 2

| Concentration of thiophene (p.p.m.) | Yield of cyclohexane (mol percent) | | | |
|---|---|---|---|---|
| | 20 | 50 | 65 | 100 |
| Catalyst used: | | | | |
| Nickel-rhenium-kieselguhr | 99.97 | 99.92 | 88.31 | 54.49 |
| Nickel-kieselguhr | 41.31 | 6.64 | 1.01 | 0.61 |

EXAMPLE 2

The catalytic hydrogenation of 50 g. of benzene containing thiophene at a concentration of 65 p.p.m. was carried out under the reaction conditions including a reaction temperature of 200° C., a reaction pressure of 100 kg./cm.$^2$ and the various reaction period as specified in the following Table 3 in the presence of 0.25 g. of the same catalyst composition comprising nickel, rhenium and kieselguhr as used in the Comparative Example. The results are shown in the following Table 3:

TABLE 3

| Reaction period (min.) | 10 | 20 | 30 | 40 | 60 |
|---|---|---|---|---|---|
| Yield of cyclohexane (mol percent) | 5.00 | 14.66 | 36.08 | 61.18 | 88.31 |

The accompanying drawing shows the above results diagrammatically.

EXAMPLE 3

The catalytic hydrogenation of 50 g. of benzene containing thiophene at a concentration of 65 p.p.m. was carried out under the reaction conditions including a reaction temperature of 200° C., a reaction pressure of 100 kg./cm.$^2$ and a reaction period of one hour in the presence of 0.25 g. of the catalyst having an atomic ratio of rhenium to nickel of 0.09 or the catalyst having an atomic ratio of rhenium to nickel of 0.015, prepared by the same procedure as used in the Comparative Example.

As a result, the yield of cyclohexane was 94.01 mol percent in the former catalyst composition and it was 72.22 mol percent in the latter catalyst composition.

What is claimed is:

1. The process for hydrogenating aromatic hydrocarbons selected from the group consisting of benzene, toluene, o-, m- or p-xylene, durene, cumene, t-butylbenzene, n-hexadecylbenzene, p-cymene, naphthalene, α- or β-methyl-naphthalene, anthracene, phenathrene, diphenyl, diphenylmethane and acenaphthene in admixture with an organic sulfur compound which comprises passing said mixture with hydrogen into contact with a catalyst composition consisting of a solid solution of nickel and rhenium under hydrogenating conditions of temperature and pressure.

2. The process according to claim 1 wherein the atomic ratio of rhenium to nickel is less than 0.1.

3. The process according to claim 1 wherein the mixture is benzene containing from 20 to 100 p.p.m. thiophene and the atomic ratio of rhenium to nickel in the catalyst is 0.03.

References Cited

UNITED STATES PATENTS

| 3,166,489 | 1/1965 | Mason | 260—667 |
| 1,999,738 | 4/1935 | Pier | 260—667 |
| 3,397,249 | 8/1968 | Abeu | 260—667 |
| 3,422,001 | 1/1969 | Kouwenhoven | 208—143 |
| 3,410,787 | 11/1968 | Kubicek | 208—143 |
| 3,400,169 | 9/1968 | Eng | 208—143 |

OTHER REFERENCES

Chemical Abstracts, vol. 64: 8062d (Pak et al., Izv. Akad. Nauktar 15(3)), pp. 78–83, 1965.

Chemical Abstracts, vol. 65: 19,961c (Fasman et al., Zh. Fiz. Kh.m. 40(9) 2212–2 (1966) (Russ)).

H. Smith Broadbent et al., J. Org. Chem. vol. 24, pp. 1847–1854, 1959.

DELBERT E. GANTZ, Primary Examiner

V. O'KEEFE, Assistant Examiner